United States Patent
Nakajima et al.

(10) Patent No.: US 7,305,620 B1
(45) Date of Patent: Dec. 4, 2007

(54) METHOD AND APPARATUS FOR PREVIEWING PRINT DATA AND RECORDING MEDIA THEREOF

(75) Inventors: Hisanori Nakajima, Nagano-ken (JP); Ian Clarke, Nagano-ken (JP); Masahiro Hirose, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 302 days.

(21) Appl. No.: 09/240,695

(22) Filed: Feb. 2, 1999

(30) Foreign Application Priority Data

Feb. 10, 1998 (JP) .................................. 10-028021
Aug. 31, 1998 (JP) .................................. 10-246352

(51) Int. Cl.
G06F 15/00 (2006.01)
B41B 15/00 (2006.01)

(52) U.S. Cl. ................. 715/527; 715/523; 715/526; 358/1.13

(58) Field of Classification Search ............. 707/527, 707/528, 530; 358/537, 542, 1.16, 1.13, 358/1.15; 715/527, 528, 530
See application file for complete search history.

(56) References Cited

U.S. PATENT DOCUMENTS

| | | | | |
|---|---|---|---|---|
| 4,677,571 A | * | 6/1987 | Riseman et al. ........... | 358/1.13 |
| 5,140,312 A | * | 8/1992 | Ishii ......................... | 345/545 |
| 5,287,434 A | * | 2/1994 | Bain et al. ................. | 235/462.15 |
| 5,303,336 A | * | 4/1994 | Kageyama et al. ........ | 358/1.15 |
| 5,327,526 A | * | 7/1994 | Nomura et al. ........... | 358/1.16 |
| 5,371,888 A | * | 12/1994 | Lehnertz et al. ........... | 718/100 |
| 5,528,734 A | * | 6/1996 | Sanchez ..................... | 358/1.16 |
| 5,566,278 A | * | 10/1996 | Patel et al. ................. | 358/1.15 |
| 5,602,974 A | * | 2/1997 | Shaw et al. ................. | 358/1.15 |
| 5,634,091 A | * | 5/1997 | Sands et al. ................ | 358/1.18 |
| 5,671,345 A | * | 9/1997 | Lhotak ........................ | 345/620 |
| 5,845,058 A | * | 12/1998 | Shaw et al. ................. | 358/1.15 |
| 6,029,182 A | * | 2/2000 | Nehab et al. ............... | 707/501.1 |
| 6,213,652 B1 | * | 4/2001 | Suzuki et al. .............. | 358/1.15 |

(Continued)

FOREIGN PATENT DOCUMENTS

EP 0 574 224 A2 6/1993

(Continued)

OTHER PUBLICATIONS

Tekla S. Perry, 'PostScrip' prints anything: a case history, IEEE, vol. 25, May 1998, pp. 42-46.*

(Continued)

Primary Examiner—William Bashore
Assistant Examiner—Maikhanh Nguyen
(74) Attorney, Agent, or Firm—Sughrue Mion, PLLC

(57) ABSTRACT

A data converter 14 converts a spooled print control code into a display data of a predetermined structure. The converted data is displayed on a displaying device. The user checks the displayed data. When the data is to be edited, the user designates the region to be edited and inputs contents of the change. In accordance with the change contents, a data edit controller 15 changes the display data. A data inverse converter 16 converts the changed display data into the structure of the original print control code, and restores the converted data into a spool file 13. The print control code which is restored is read out by a despooler 17, and then transferred to a printing device through transfer controlling means.

17 Claims, 8 Drawing Sheets

U.S. PATENT DOCUMENTS

| | | | |
|---|---|---|---|
| 6,229,622 B1 * | 5/2001 | Takeda | 358/1.13 |
| 6,337,744 B1 * | 1/2002 | Kuroda | 358/1.13 |
| 6,441,919 B1 * | 8/2002 | Parker et al. | 358/1.18 |
| 6,580,521 B1 * | 6/2003 | Nishikawa et al. | 358/1.18 |
| 6,633,400 B1 * | 10/2003 | Sasaki et al. | 358/1.15 |
| 6,678,066 B1 * | 1/2004 | Nakamura | 358/1.13 |
| 6,734,986 B1 * | 5/2004 | Kuroi et al. | 358/1.16 |
| 6,788,427 B1 * | 9/2004 | Okigami | 358/1.15 |

FOREIGN PATENT DOCUMENTS

| | | |
|---|---|---|
| EP | 0887 746 A2 | 12/1998 |
| JP | 07-325693 | 12/1995 |
| JP | 08-129462 A | 5/1996 |
| JP | 09-198217 A | 7/1997 |
| JP | 10-091805 | 4/1998 |

OTHER PUBLICATIONS

J. Acken, "How Watermarking Adds Value to Digital Content," ACM, vol. 41, No. 7, Jul. 1998, pp. 74-77.*

F. Mintzer et al., "Opportunities for Watermaking Standards," ACM, vol. 41, No. 7, Jul. 1998, pp. 56-64.*

* cited by examiner

METHOD AND APPARATUS FOR PREVIEWING PRINT DATA AND RECORDING MEDIA THEREOF

BACKGROUND OF THE INVENTION

1. Field of the Invention

The present invention relates to a previewing method, which, in a device having a spooling function, enables print data based on a print request to be visually checked and edited immediately before printing, a previewing device which is suitable for implementation of the previewing method, and a recording media for causing a computer device to execute the previewing method.

2. Description of the Related Art

Recently, part of a process in a print control which is to be performed in a printing device such as a printer is generally performed in a host computer. For example, the host computer converts data based on a print request input from an application program (hereinafter, referred to as "AP") into a print control code of a structure which can be read by the printing device, spools a print control code of a structure which can be read by the printing device, spools a print control code after conversion, and sends a despooled (inversely spooled) print control data to the printing device.

A spool process is performed in order to eliminate a waste waiting time period in a print control process which is due to a difference between the speed of sending a print control code to the printing device and the actual printing speed of the printing device. Specifically, a print control code is once written into a spool file, and the written print control code is read out asynchronously with the writing and then sent to the printing device. The writing and the reading are executed by independent tasks, respectively. Therefore, various kinds of added-value information for increasing the variety of print forms, such as a control code for overlapping printing a template data of a watermark, a stamp mark, or the like, and that for conducting allocation printing are often added to an actual print control code based on a print request. A "watermark" is a character(s) which is overlappingly printed in the background of printed characters or the like that are printed in accordance with instructions of the AP, in a color or a display form which is different from that of the printed characters. A "stamp mark" is a mark which is similar to a conventional stamp.

In related arts, after once the AP gives a print request or the host computer adds added-value information to the printing device, the user cannot check the finished condition of the actual printing before printing is actually output from the printing device. Some kinds of APs or host computers can display an image to be printed, on a displaying device. However, such a displayed image is not based on data which are sent to the printing device, and only an image which the AP or the like can know is displayed. In other words, the AP or the like cannot know added-value information of a watermark, allocation, and the like, and hence the displayed image fails to correctly reflect the finished condition of the actual printing.

SUMMARY OF THE INVENTION

It is an object of the invention to provide a method of previewing a print data which allows the user to visually check in advance the finished condition of actual printing and arbitrarily edit added-value information and the like.

It is another object of the invention to provide a previewing device which is suitable for implementing the previewing method of the invention.

It is further object of the invention to provide recording media for realizing the previewing method or the previewing device in a general-purpose computer device.

The previewing method of the invention which can attain the object is characterized in that the method comprises the steps of: obtaining a print data which can be printed by a printing device, and spooling the print data into a predetermined memory; converting the spooled print data into a display data of a predetermined structure, and displaying the display data on a displaying device; editing the display data which is being displayed, on the basis of an edition data which is input at the display; and inversely converting the edited display data into a structure of the spooled print data.

The step of editing the display data includes a process of correcting color components contained in the display data which is being displayed. When the print data consists of actual print information based on a print request and added-value information which is posteriorly added, the step of editing the display data uses only the added-value information which is being displayed, as an edition object.

For example, the added-value information is a template data used for an overlapping print, which is allocated to a printing sheet with being shared among a plural of other allocated pages. In one of the modes of this case, when a position of the template data in one of the allocated pages is changed, the positional change is reflected on the other allocated pages. Specifically, when the position of the template data in one of the allocated pages is moved, the movement of the position is linked with movement of the position of the template data in the other allocated pages. In another mode of this case, the position of the template data in each of the allocated pages is varied depending on whether the page is an odd page or an even page.

The previewing device of the invention which can attain the other object is characterized in that the device comprises: spooling means for spooling a print data which can be printed by a printing device; data converting means for converting the spooled print data into a display data of a predetermined structure; display controlling means for displaying the converted display data on a displaying device; data editing means for editing the display data which is being displayed, on the basis of an edition data which is input into the display; and data inversely converting means for inversely converting the edited display data into a structure of the spooled print data, and a print data based on a print request is visually edited immediately before printing.

For example, the data editing means includes object detecting means for detecting an object of a region which is designated in the display data which is being displayed, and object editing means for editing contents of the detected object on the basis of an instruction, and the data editing means edits the display data in the unit of object. The data editing means edits a display data which is spooled and converted in a predetermined time period.

The recording media of the invention which can attain the further object is a recording media on which program codes are recorded, the program codes being to be read and executed by a computer device having input means for a data and the like and a displaying device, and connected to a printing device, and the program codes causes the computer device to perform the following process:

(1-1) a spool process of spooling a print data which can be printed by the printing device;

(1-2) a data conversion process of converting the spooled print data into a display data of a predetermined structure;

(1-3) a display control process of displaying the converted display data on the displaying device;

(1-4) a data edition process of editing the display data which is being displayed, on the basis of an edition data which is input at the display of the displaying device, through the input means; and (1-5) a data inverse conversion process of inversely converting the edited display data into the structure of the spooled print data.

Figure 5:
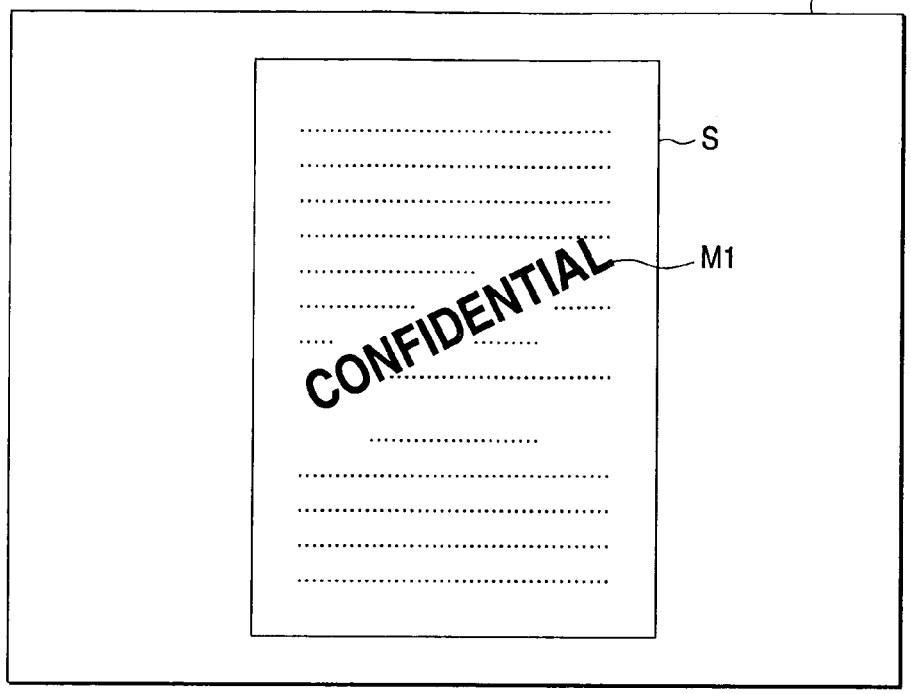
Figure 5:
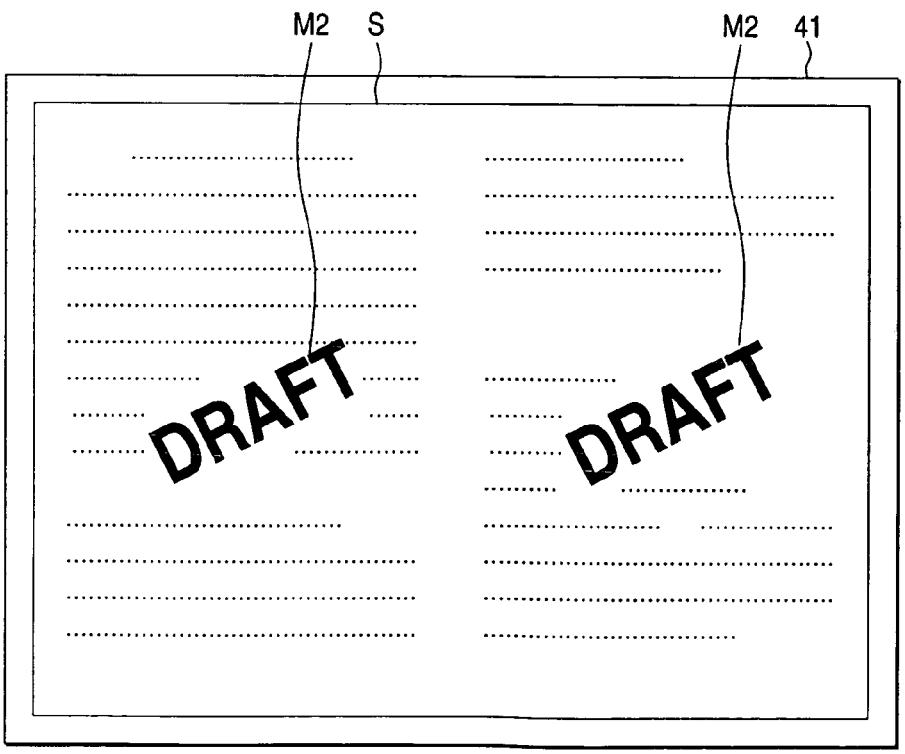

(a) of FIG. 5 is a view showing an example of a preview screen in the case where a watermark is overlapping printed on a print sheet, and (b) of FIG. 5 is a view showing an example of the preview screen in the case where another watermark is overlapping printed on two allocated pages.

Figure 6:
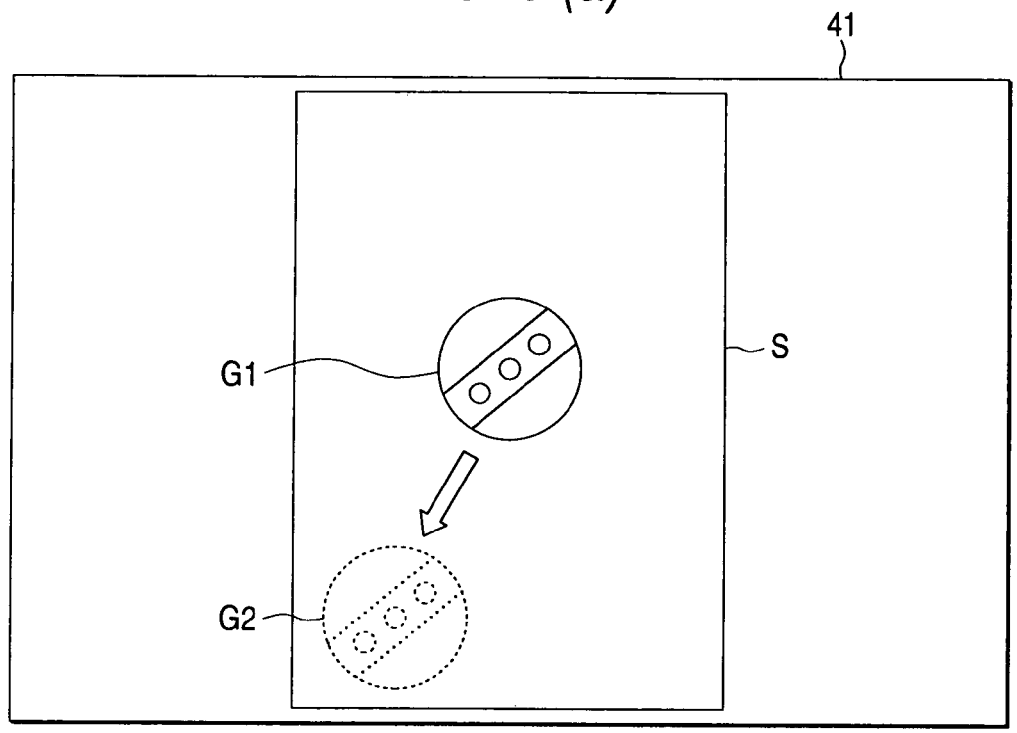
Figure 6:
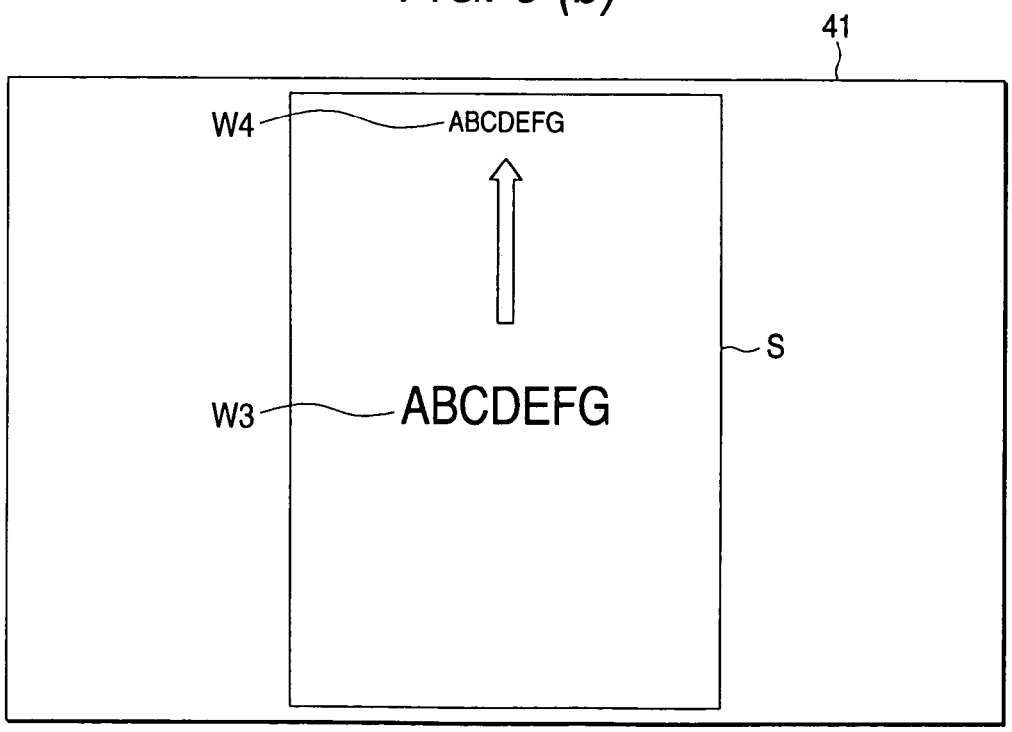

(a) of FIG. 6 is a view showing an example in the case where the position of a stamp mark which is to be overlapping printed on a print sheet is changed, and (b) of FIG. 6 is a view showing an example in the case where both the position and the size of a watermark which is to be overlapping printed on the print sheet are changed.

Figure 7:
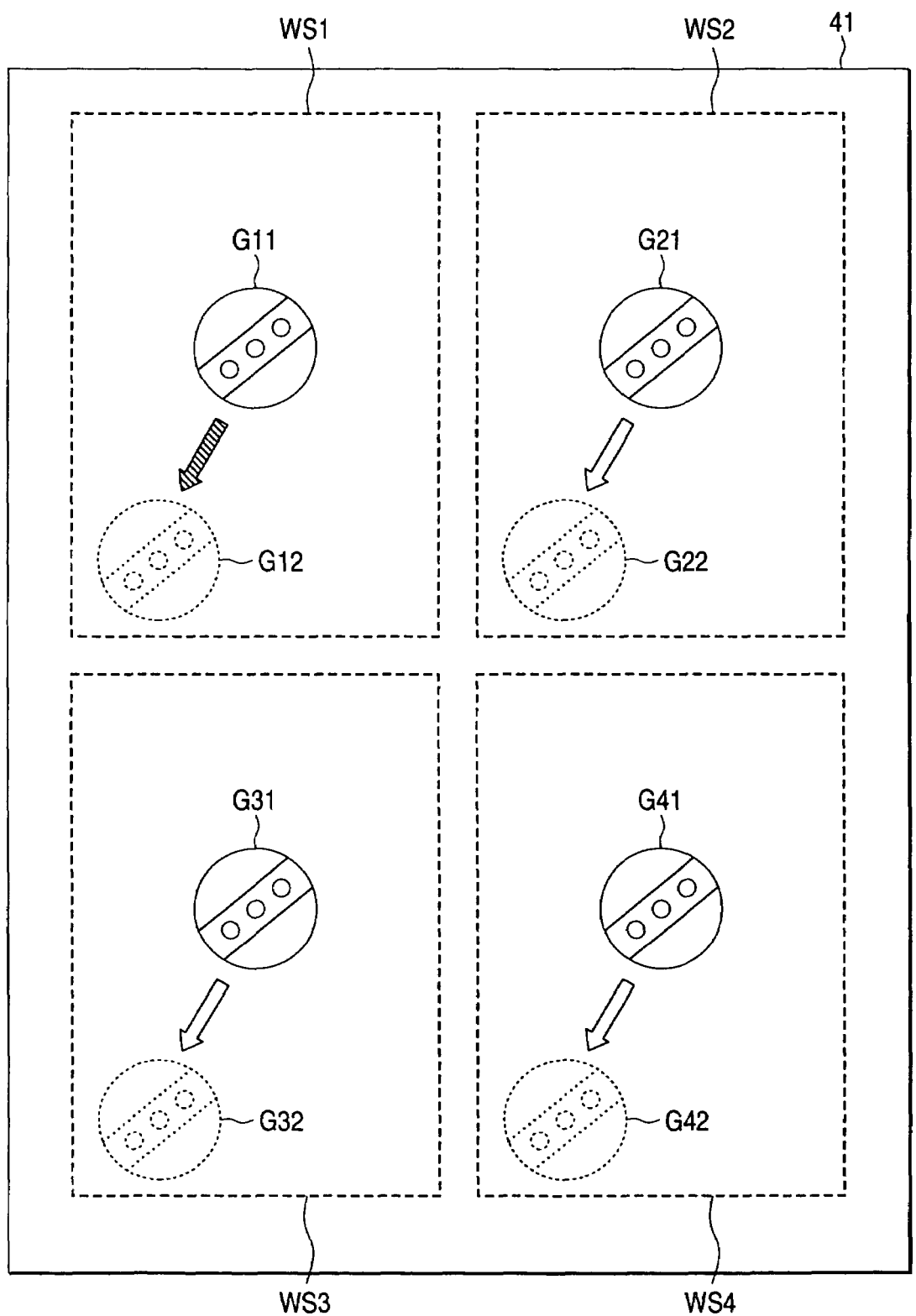

FIG. 7 is a view showing a manner in which, when a stamp mark is to be overlapping printed on each of four allocated pages and the position of the stamp mark on one of the allocated pages is changed, also the stamp marks on the other allocated pages are changed to the same position in an interlocked manner.

Figure 8:
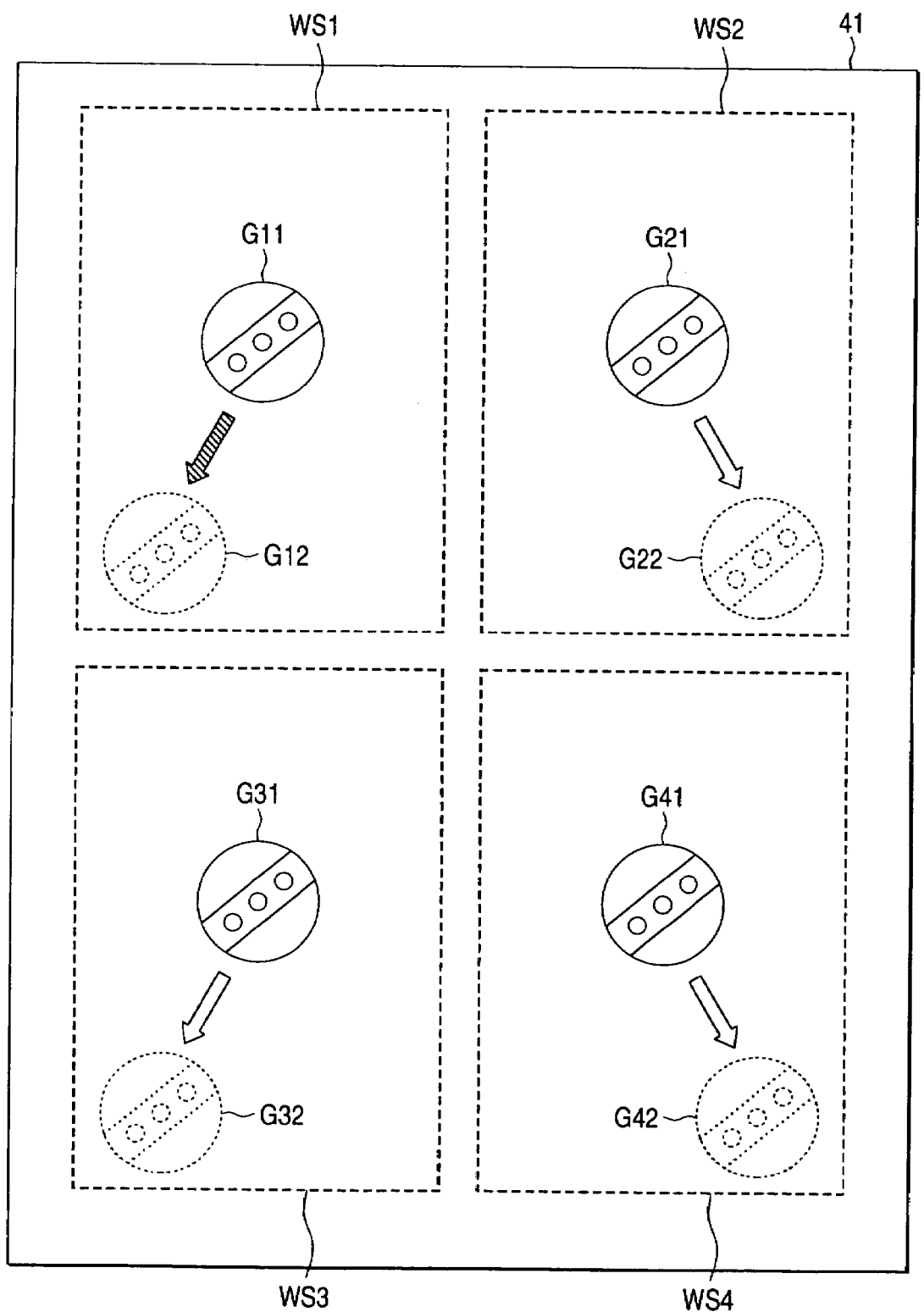

FIG. 8 is a view showing an example of contents of the data edition by the embodiment and showing a manner in which stamp marks on allocated pages are changed to the left side in odd pages, and to the right side in even pages.

Figure 9:
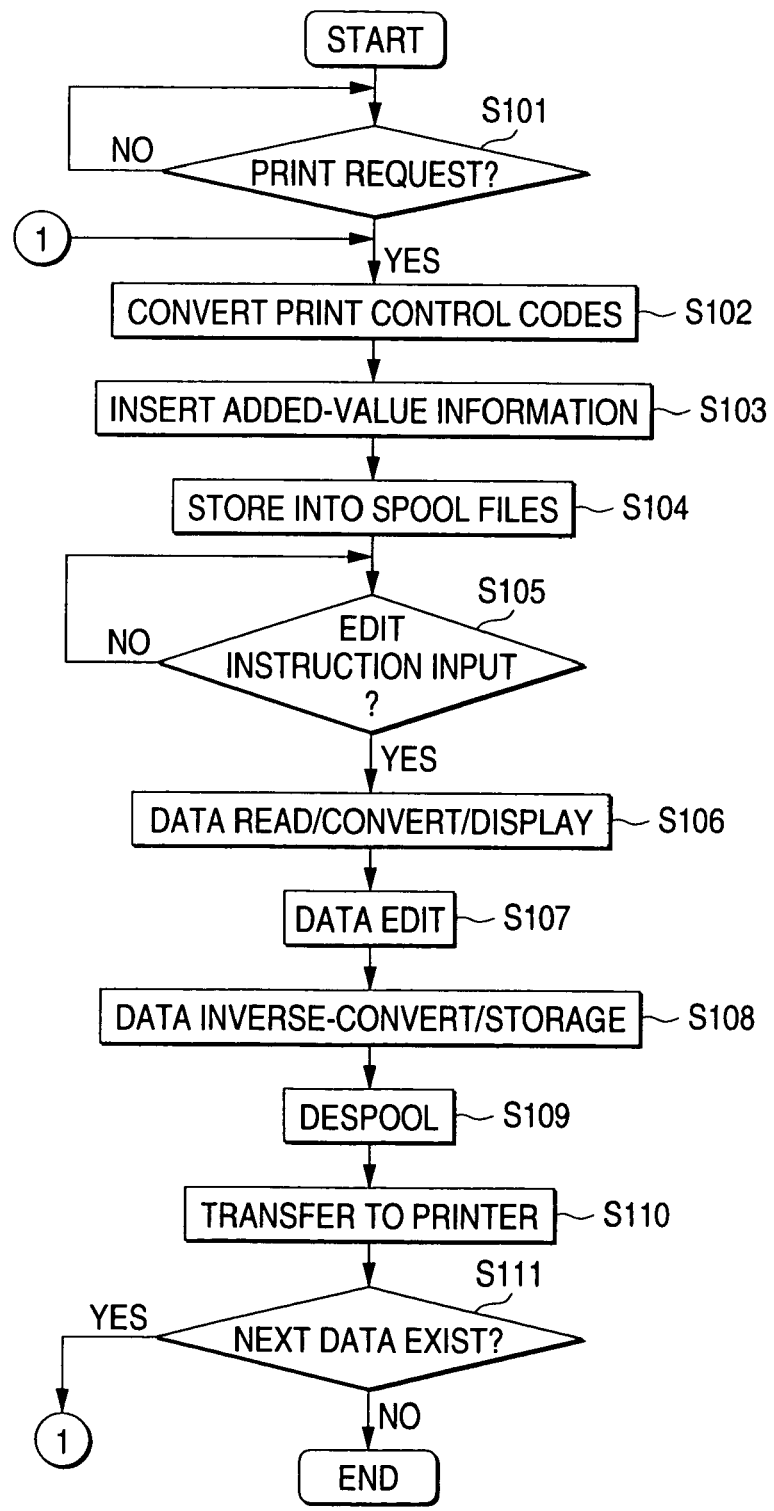

FIG. 9 is a flowchart of the whole process of the previewing device of the embodiment.

Figure 10:
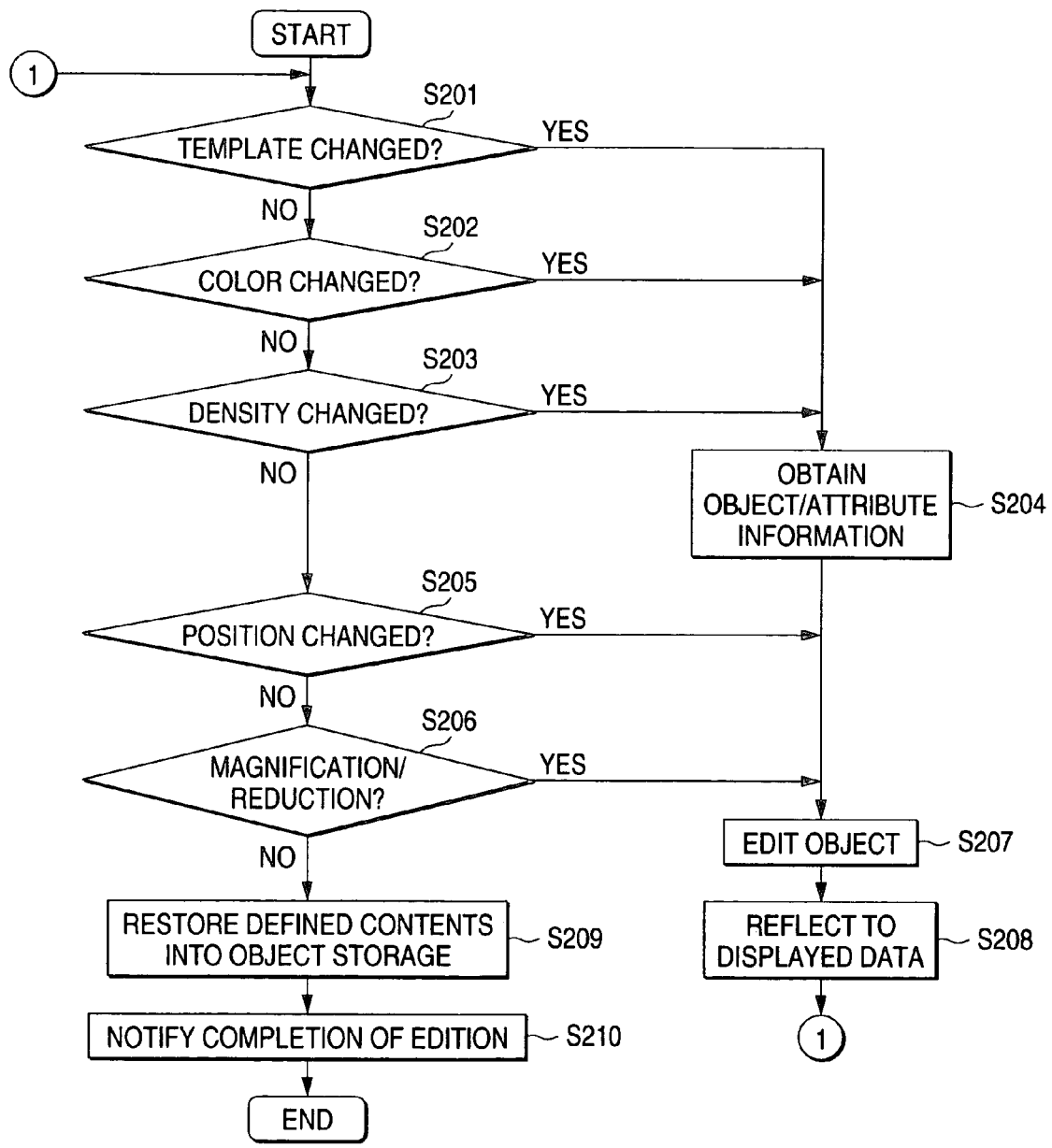

FIG. 10 is a flowchart of a data edit controller in the embodiment.

DESCRIPTION OF THE PREFERRED EMBODIMENTS

Figure 1:
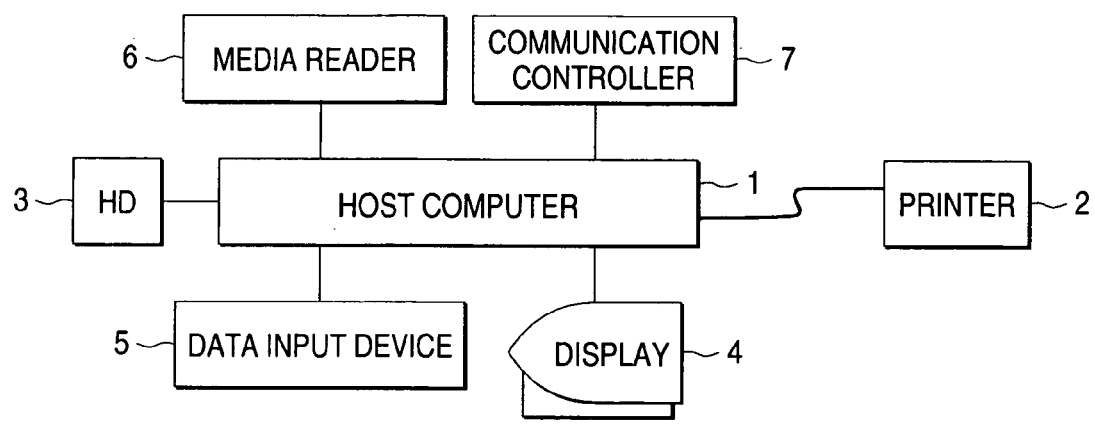
FIG. 1 is a diagram showing the configuration of a print system to which the invention is applied.

Hereinafter, one of the embodiments of the invention will be described with reference to the accompanying drawings. FIG. 1 is a diagram showing the configuration of a print system to which the previewing device is applied. In the print system, a host computer 1 is connected to a printing device 2 through a printer cable. When the printing device 2 receives a print control code (hereinafter, referred to as "print data") from the host computer 1, the device executes a predetermined print process to form an image on a print sheet. The printing device 2 may be either of a serial printer, a page printer, or an electrophotographic printer of another kind, and may be connected to the host computer 1 in a stand-alone state or a network system.

The host computer 1 comprises a CPU (Central Processing Unit), a RAM (Random Access Memory), and a ROM (Read Only Memory) which are arranged on a system board (not shown), and an internal or external hard disk drive (HD) 3. A program is loaded from a recording media into the HD 3. The CPU adequately reads out the program from the HD 3 to execute a required process. The HD 3 stores an application program (hereinafter, referred to as "AP"), a control program for realizing the previewing device of the invention, and the like.

To the host computer 1, connected are a displaying device 4 having a monitor screen, a data input device 5, a media reading device 6 including a CD-ROM drive and an FDD drive, and a communication controller device 7 serving as a connection interface with a local network. The displaying device 4 displays a predetermined dialog window in accordance with instructions from a system program, an AP, etc. The data input device 5 includes a keyboard, a mouse, and other pointing devices.

The control program for realizing the previewing device is recorded in a form which can be read out by the host computer 1, on a portable recording media such as a flexible disk, a hard disk, an optical disk, an magnetooptical disk, a CD-ROM, a CD-R, a DVD, or a magnetic tape, and can be installed onto the HD 3 through the media reading device 6. Alternatively, the control program may be installed onto the HD 3 through a program server which can be accessed via the communication controller device 7. The function as a previewing device is formed by executing the control program. Alternatively, the operating system working on the host computer 1 may conduct part of the actual process in response to an instruction from the control program, and the function as a previewing device may be formed by performing the process.

Figure 2:
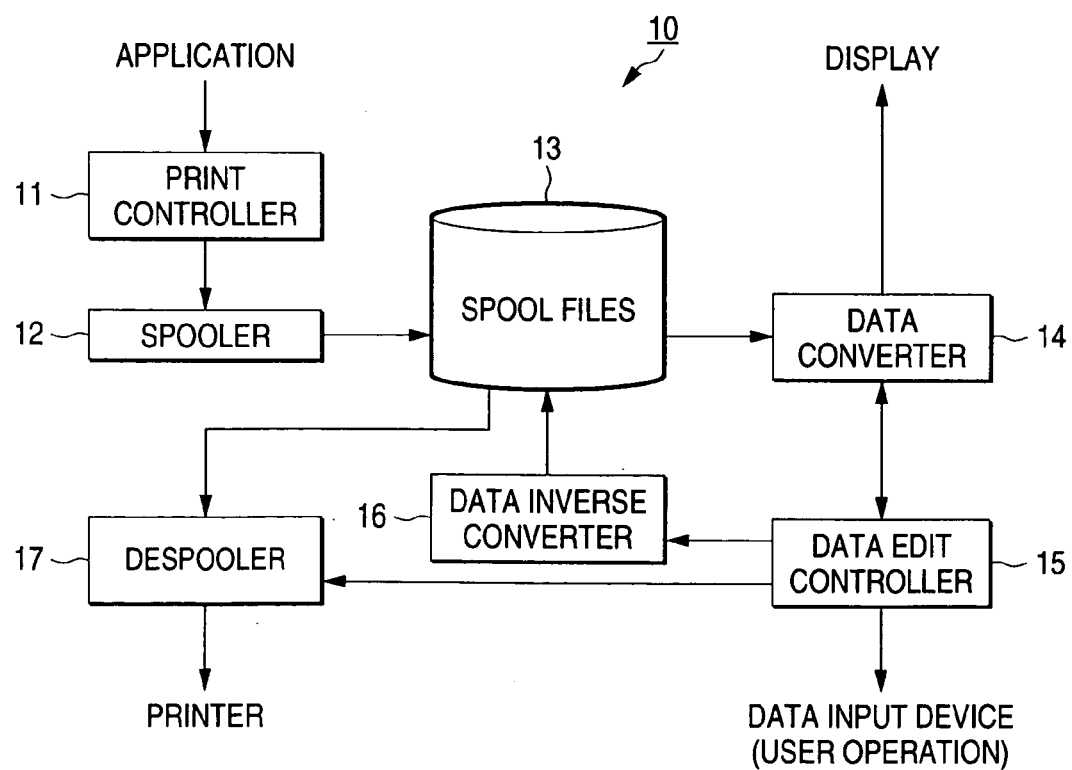
FIG. 2 is a functional block diagram of a previewing device of the embodiment.

Next, the function of the previewing device which is realized by reading and executing the control program by the host computer 1 will be described. As shown in FIG. 2, the previewing device 10 comprises functional blocks of a print controller 1, a spooler 12, a data converter 14, a data edit controller 15, a data inverse converter 16, and a despooler 17, and a spool file 13. In FIG. 2, only components which are required for embodying the invention are shown.

The print controller 11 converts a data based on a print request from, for example, the AP or the data input device 5, into a print control code of a structure which can be read by the printing device 2. The print controller has also a function of adding to a print control code, added-value information such as a template data of a watermark, a stamp mark, or the like, and designation of allocation printing, and designation of overlapping printing of a template data in allocation printing. The "allocation printing" is a process of allocating plural logical pages to a physical print page. This process is realized by a process of reducing a print image, and that of designating coordinates of a print position after the page reduction.

The spooler 12 temporarily stores a print control code which is output from the print controller 11, into the spool file 13. The despooler 17 reads out the data stored in the spool file 13 and then outputs the read out data (the spool process). The data output from the despooler 17 is transmitted to the printing device 2 through transfer controlling means which is not shown.

The data converter 14 converts the print control code stored in the spool file 13, into a display data of a structure which can be displayed on the displaying device 4, and sends the data to the displaying device 4 via display controlling means which is not shown, so as to display the data. The data converter 14 sends the display data for the displaying device 4, also to the data edit controller 15.

Figure 3:
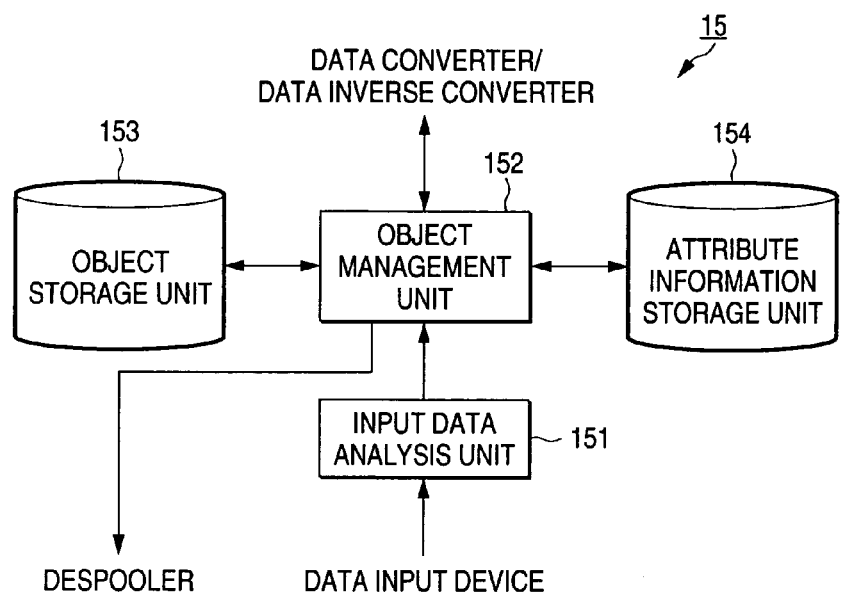
FIG. 3 is a diagram showing in detail the configuration of a data edit controller in the embodiment.

On the basis of an edit instruction data which is input by the user at the display on the displaying device 4, the data edit controller 15 edits the data which is being displayed, i.e., the data which is substantially identical with the data stored in the spool file 13. The object of edition is the template data of the added-value information which is added in the print controller 11. The contents to be edited include attributes of the template data such as the kind, the color, the density, the position, and the size. In order to realize the editing function, the data edit controller 15 manages each template data as an object, and edits the contents of the object on the basis of the edit instruction data. As shown in FIG. 3, the data edit controller has function blocks of an input data analysis unit 151, an object management unit 152, an object storage unit 153, and an attribute information storage unit 154.

The input data analysis unit 151 analyzes contents of an instruction data which is input by the user through the data input device 5, and transmits the contents to the object management unit 152.

The object management unit 152 has the following functions.

(1) The unit stores a template data (object) which is input from the data converter 14, into the object storage unit 153, and supplies an object stored in the object storage unit 153 to the data inverse converter 16.

(2) The unit detects a corresponding object on the basis of the analysis result of the input data analysis unit 151, and reads out the detected object from the object storage unit 153. The unit reads out the corresponding attribute information from the attribute information storage unit 154, and edits the object.

(3) In the case where allocation printing is designated, the unit determines the position of the object of overlapping printing on each of allocated pages. When the position of the object in one allocated page is changed, the objects of all the other allocated pages are usually changed to the same position in an interlocked manner. In response to some kinds of the instruction data input by the user, the position of the object in each of the allocated pages is varied depending on whether the page is an odd page or an even page. This is implemented by a coordinate process in allocation printing.

(4) The unit restores the edited object into the object storage unit 153, and sends the object through the data converter 14 so as to display it on the displaying device 4.

(5) During edition, the unit outputs a read stop signal so that the operation of the despooler 17 is stopped in the unit of printing or in the unit of page. After the edition is ended, the unit outputs a cancel signal so as to restart the operation of the despooler 17. During a predetermined time period, for example, an object which is spooled in the unit of printing may be edited. In this case, preferably, the edition is enabled after a precheck for edition is performed.

Figure 4:
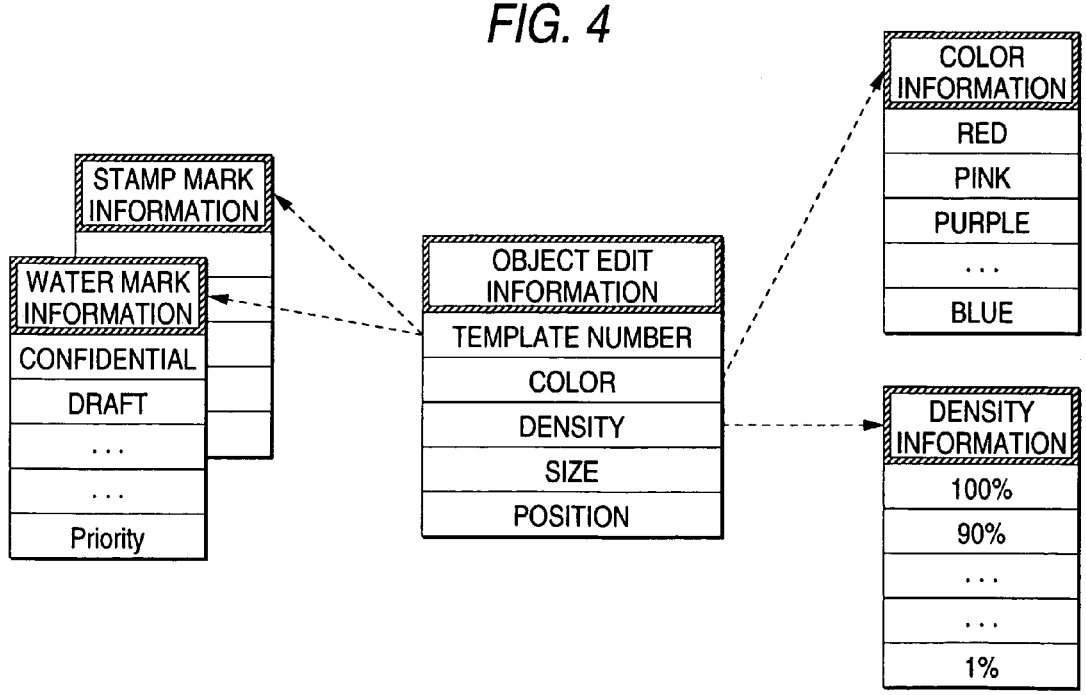
FIG. 4 is a diagram showing the contents of an attribute information storage unit of the data edit controller.

The attribute information storage unit 154 stores attribute information examples of which are shown in FIG. 4. Specifically, the unit holds object edit information as index information, and links attribute information of each object, for example, the template number (identification information of watermark/stamp mark), the color, the density, the size, the position, and the like, with index information. As illustrated, the color information may be previously fixedly prepared. Alternatively, the color information may not be restricted to such a form, and the hue, the brightness, and the like may be adjusted for each printing by the user. The density information can be arbitrarily selected to be 1 to 100% in the term of the dot number ratio. The size and the position may be previously determined on the basis of coordinate information, or arbitrarily determined by the user.

FIGS. 5 to 8 show examples of a preview screen which is displayed on the displaying device 4 as a result of edition in the thus configured data edit controller 15.

(a) of FIG. 5 shows an example of a preview screen 41 in the case where a watermark M1 is overlapping printed on a print sheet S, and (b) of FIG. 5 shows an example of the preview screen 41 in the case where another watermark M2 is overlapping printed on two allocated pages. The kind, the color, the density, the size, and the position of each of the watermarks M1 and M2 can be posteriorly changed by the user while observing the preview screen 41.

(a) of FIG. 6 shows an example in the case where the position of a stamp mark which is to be overlapping printed on the print sheet S is changed, and (b) of FIG. 6 shows an example in the case where both the position and the size of a watermark which is to be overlapping printed on the print sheet S are changed. The reference numeral G1 denotes the stamp mark before edition, G2 denotes the stamp mark after edition, W3 denotes the watermark before edition, and W4 denotes the watermark after edition.

FIG. 7 shows a manner in which, when a stamp mark is to be overlapping printed on each of, for example, four allocated pages and the position of the stamp mark on one of the allocated pages is changed, also the stamp marks on the other allocated pages are changed to the same position in a cooperative manner. In the illustrated example, when the position of a stamp mark G11 on the first page is changed to that of a stamp mark G12 indicated by broken lines, stamp marks G21, G31, and G41 on the other allocated pages are changed cooperatively to stamp marks G22, G32, and G42, respectively.

FIG. 8 shows a manner in which the stamp marks G11, G21, G31, and G41 on the allocated pages are changed to the left-side stamp marks G12 and G32 in odd pages, and to the right-side stamp marks G22 and G42 in even pages. FIGS. 7 and 8 show the examples of stamp marks. Also watermarks can be processed in the same manner. The inclination angles of watermarks may be varied depending on whether the page is an odd page or an even page. Also this configuration corresponds to the above-described position change.

Next, the operation of the previewing device 10 of the embodiment will be described with reference to FIGS. 9 and 10. FIG. 9 is a flowchart of the whole process, and FIG. 10 is a flowchart of the data edit controller 15 in the case where the above-mentioned preview screen 41 is displayed.

Referring to FIG. 9, when a print request is input from the AP or the like (Step S100: Yes), the print controller 11 converts a data which is an object of printing into a print control code of a structure which can be read by the printing device 2, and, as required, inserts added-value information into the print control code (steps S102 and S103). The spooler 12 stores the print control code into the spool file 13 (step S104). If an edit instruction is input from, for example, the data input device 5 (Step S105: Yes), the data converter 14 reads out the print control code from the spool file 13 to perform data conversion, supplies the converted data to the data edit controller 15, and displays the preview screen 41 on the displaying device 4 (step S106). At this time, the data edit controller 15 temporarily stops the operation of the despooler 17.

The data edit controller 15 performs the data edition in the procedure shown in FIG. 10 (step S107). If the user observing the preview screen 41 instructs one of the kind, the color, and the density of the template to be changed (step S201: Yes, S202: Yes, or S203: Yes), the unit reads the corresponding object from the object storage unit 153, and obtains attribute information through template edit information of the attribute information storage unit 154 (step S204). If also a change of the position or the size is instructed, also information of the data is obtained or detected (step S205: Yes, or step S206: Yes), and the object edit is performed (step S207). After the edition, the contents of the edition are reflected on the display data of the preview screen 41 (step S208). If a further change is not required as a result of edition or if there is no need for edition (step S201: No, S202: No, S203: No, S205: No, and S206: No), the defined contents of the object are restored into the object storage unit 153 (step S209), and the completion of the edition is notified to the data inverse converter 16 and the despooler 17 (step S210).

Returning to FIG. 9, in response to the reception of the notification of the completion of the edition, the data inverse converter converts the edited data or the data which is sent out as it is, into the structure of the original print control code, and restores the converted data into the spool file 13 (step S108). The despooler 17 restarts to operate so as to read out a print control code from the spool file 13 at a predetermined timing (step S109), and supplies the print control code to the transfer controlling means which is not shown. The transfer controlling means sequentially transfers the print control code to the printing device 2 (step S110). If there is a succeeding data for the print request, the process subsequent to step S102 is repeatedly performed (step S111: Yes). If there is no succeeding data, the process is ended (step S111: No).

As described above, in the previewing device 10 of the embodiment, the edition can be conducted while visually checking the contents stored in the spool file 13. Therefore, the user can correctly know the image which is immediately before the printing.

The invention is configured as described above. The invention is not restricted to the above-described embodiment, and may be variously modified. In the above, the example of the procedure in which, in response to an input of an edition instruction through the data input device 5, the operation of the despooler 17 is temporarily stopped and the data conversion and the data edition are conducted has been described. Alternatively, at the timing when a print control code is stored in the spool file 13, the contents of the code may be immediately displayed on the displaying device 4, and, at the timing when the user designates a region to be edited, the operation of the despooler 17 may be temporarily stopped.

As apparent from the above description, according to the invention, the user can visually check a data which is immediately before the printing, and arbitrarily edit the data. Therefore, an AP is not required to perform the edition in consideration of the performance of a printing device. The contents of the edition performed by the AP can be posteriorly amended in the unit of page or the like, and hence the printing of a form which is more suitable to the taste of the user is enabled.

What is claimed is:

1. A method for previewing a print data, comprising the steps of:
   obtaining print data which can be printed by a printing device, and spooling the print data into a predetermined memory;
   converting the spooled print data into display data of a predetermined structure, and displaying the display data on a displaying device;
   editing the display data which is being displayed, on the basis of an edit instruction data which is input at the display; and
   inversely converting the edited display data into a structure of the spooled print data,
   wherein, the display data contains template data that is subjected to the editing, and at least a type and a position of the template data are capable of being edited via the editing.

2. A previewing method according to claim 1, wherein said step of editing the display data includes a process of correcting color components contained in the display data which is being displayed.

3. A method for previewing a print data, comprising the steps of:
   obtaining print data which can be printed by a printing device, and spooling the print data into a predetermined memory;
   converting the spooled print data into display data of a predetermined structure, and displaying the display data on a displaying device;
   editing the display data which is being displayed, on the basis of an edit instruction data which is input at the display;
   wherein, when the print data consists of actual print information based on a print request and added-value information which is posteriorly added, said step of editing the display data uses only the added-value information which is being displayed, as an edited object; and
   inversely converting the edited display data into a structure of the spooled print data,
   wherein the added-value information includes at least template data.

4. A previewing method according to claim 3, wherein, the added-value information is template data which can be overlapping printed onto plural allocated pages, said allocated pages being allocated to one print sheet, and, when a position of the template data in one of the allocated pages is changed, the position change is reflected on the other allocated pages.

5. A previewing method according to claim 4, wherein movement of the position of the template data in one of the allocated pages is interlocked with movement of the position of the template data in the other allocated pages.

6. A previewing method according to claim 3, wherein, the added-value information is template data which can be overlapping printed onto plural allocated pages, said allocated pages being allocated to one print sheet, and the position of the template data in one of the allocated pages is varied, depending on whether the page is an odd page or an even page.

7. A method of previewing a print data, comprising:
   spooling means for spooling print data which can be printed by a printing device;
   data converting means for converting the spooled print data into display data of a predetermined structure;

display controlling means for displaying the converted display data on a displaying device;

data editing means for editing the display data which is being displayed, on the basis of edited data which is input at the display; and data inversely converting means for inversely converting the edited display data into a structure of the spooled print data, and editing means for editing visually a print data based on a print request, wherein said editing means is performed immediately before printing, wherein, the display data contains template data that is subjected to the editing, and at least a type and a position of the template data are capable of being edited via the editing.

8. A previewing device according to claim 7, wherein said data editing means includes object detecting means for detecting an object of a region which is designated in the display data which is being displayed, and object editing means for editing contents of the detected object on the basis of an instruction, and said data editing means edits the display data in the unit of object.

9. A previewing device according to claim 7, wherein said data editing means edits display data which are spooled and converted in a predetermined time period.

10. A computer-readable medium on which program codes are recorded, wherefore said program codes are read and executed by a computer device, being connected to a printing device, having input means for a data entry and a displaying device, with causing said computer device to perform the following processes:

(1) a spool process of spooling print data which can be printed by said printing device;

(2) a data conversion process of converting the spooled print data into display data of a predetermined structure, (3) a display control process of displaying the converted display data on said displaying device;

(4) a data edition process of editing the display data which is being displayed, on the basis of edited data which is input at the display of said displaying device, through said input means; and (5) data inverse conversion process for inversely converting the edited display data into a structure of the spooled print data, wherein, the display data contains template data that is subjected to the editing, and at least a type and a position of the template data are capable of being edited via the editing.

11. A computer-readable medium on which program codes are recorded, wherefore said program codes are read and executed by a computer device, being connected to a printing device, having input means for a data entry and a displaying device, with causing said computer device to perform the following processes:

(1) a spool process of spooling print data which can be printed by said printing device;

(2) a data conversion process of converting the spooled print data into display data of a predetermined structure, (3) a display control process of displaying the converted display data on said displaying device;

(4) a data edition process of editing the display data which is being displayed, on the basis of edited data which is input at the display of said displaying device, through said input means;

wherein said data edit process is a process of detecting an object added to the print data and editing contents of the object on the basis of an instruction; and (5) data inverse conversion process for inversely converting the edited display data into a structure of the spooled print data.

12. The computer readable medium according to claim 10, wherein said data edition process includes a process of correcting color components contained in the display data which is being displayed.

13. A computer-readable medium on which program codes are recorded, wherefore said program codes are read and executed by a computer device, being connected to a printing device, having input means for a data entry and a displaying device, with causing said computer device to perform the following processes:

(1) a spool process of spooling print data which can be printed by said printing device;

(2) a data conversion process of converting the spooled print data into display data of a predetermined structure, (3) a display control process of displaying the converted display data on said displaying device;

(4) a data edition process of editing the display data which is being displayed, on the basis of edited data which is input at the display of said displaying device, through said input means;

wherein, when the print data consists of actual print information based on a print request and added-value information which is posteriorly added, said data edition process uses only the added-value information which is being displayed, as an edition object; and (5) data inverse conversion process for inversely converting the edited display data into a structure of the spooled print data, wherein the added-value information includes at least template data.

14. The computer readable medium according to claim 13, wherein, the added-value information is template data which can be overlapping printed onto plural allocated pages, said allocated pages being allocated to one print sheet, and, when a position of the template data in one of the allocated pages is changed, the position change is reflected on the other allocated pages.

15. The computer readable medium according to claim 14, wherein movement of the position of the template data in one of the allocated pages is interlocked with movement of the position of the template data in the other allocated pages.

16. The computer readable medium according to claim 13, wherein, the added-value information is template data which can be overlapping printed onto plural allocated pages, said allocated pages being allocated to one print sheet, and the position of the template data in one of the allocated pages is varied depending on whether the page is an odd page or an even page.

17. A method for previewing a print data, comprising:

obtaining print data which can be printed by a printing device, and spooling the print data into a predetermined memory;

converting the spooled print data into display data of a predetermined structure, and displaying the display data on a displaying device;

editing the display data which is being displayed according to the user's input;

displaying the edited display data; and inversely converting the edited display data into a structure of the spooled print data, wherein, the display data contains template data that is subjected to the editing, and at least a type and a position of the template data are capable of being edited via the editing.

\* \* \* \* \*